(12) United States Patent
Datema et al.

(10) Patent No.: US 11,724,749 B2
(45) Date of Patent: Aug. 15, 2023

(54) FABRIC FENDER

(71) Applicant: Oshkosh Corporation, Oshkosh, WI (US)

(72) Inventors: Bryan S. Datema, Rochester, MN (US); Clint D. Glunz, Rochester, MN (US); Jeffrey Black, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 425 days.

(21) Appl. No.: 16/944,335

(22) Filed: Jul. 31, 2020

(65) Prior Publication Data

US 2021/0039719 A1 Feb. 11, 2021

Related U.S. Application Data

(60) Provisional application No. 62/883,393, filed on Aug. 6, 2019.

(51) Int. Cl.
*B62D 25/16* (2006.01)
*B62D 25/18* (2006.01)

(52) U.S. Cl.
CPC ........... *B62D 25/168* (2013.01); *B62D 25/18* (2013.01)

(58) Field of Classification Search
CPC .... B62D 25/168; B62D 25/18; B62D 25/161; B62D 25/188; B62D 25/163; B60J 7/062; B60J 7/104; B60J 7/04; B60J 11/10
See application file for complete search history.

(56) References Cited

U.S. PATENT DOCUMENTS

| | | | | |
|---|---|---|---|---|
| 1,049,946 | A * | 1/1913 | Tyrell | B62D 25/186 280/157 |
| 4,268,053 | A * | 5/1981 | Toppins | B62D 25/168 280/154 |
| 4,406,474 | A * | 9/1983 | Scharf | B62D 25/168 280/154 |
| 4,417,741 | A * | 11/1983 | Ciocan | B62D 25/168 248/201 |
| 4,923,240 | A * | 5/1990 | Swanson | B60J 7/104 296/100.18 |
| 5,511,843 | A * | 4/1996 | Isler | B60J 7/104 296/100.17 |
| 5,906,407 | A * | 5/1999 | Schmeichel | B60J 7/104 296/100.18 |
| 6,354,625 | B1 * | 3/2002 | Lambertus | B62D 25/168 280/154 |
| 6,802,517 | B1 * | 10/2004 | Wuthrich | B62D 25/18 280/157 |

(Continued)

FOREIGN PATENT DOCUMENTS

| GB | 327459 A | * | 4/1930 | |
|---|---|---|---|---|
| GB | 2035932 A | * | 6/1980 | ........... B62D 25/161 |

*Primary Examiner* — Steve Clemmons
(74) *Attorney, Agent, or Firm* — Foley & Lardner LLP

(57) ABSTRACT

A fender for a vehicle includes a first set of an inner member and an outer member at a first position, and a second set of the inner member and the outer member at a second position that is longitudinally offset from the first position. The fender also includes a fabric disposed between the inner member and the outer member of the first set at a first end and the inner member and the outer member of the second set at a second end. The fabric extends longitudinally between the first set and the second set.

20 Claims, 10 Drawing Sheets

(56) References Cited

U.S. PATENT DOCUMENTS

| | | | |
|---|---|---|---|
| 7,185,920 B2 * | 3/2007 | Drummond | B62D 25/168 |
| | | | 280/851 |
| 7,578,379 B2 | 8/2009 | Gillmore et al. | |
| 7,648,015 B2 | 1/2010 | Gillmore et al. | |
| 7,931,397 B2 | 4/2011 | Lindblom et al. | |
| 8,028,781 B2 * | 10/2011 | Fausch | A01B 71/08 |
| | | | 180/69.1 |
| D652,771 S * | 1/2012 | Deturt | D12/184 |
| 8,613,543 B2 | 12/2013 | Lindblom et al. | |
| 8,646,965 B2 | 2/2014 | Datema et al. | |
| 9,027,983 B2 * | 5/2015 | Butler | B62D 25/188 |
| | | | 280/847 |
| D737,366 S | 9/2015 | Datema et al. | |
| 9,186,972 B1 * | 11/2015 | Holeman | B60R 19/44 |
| D772,306 S | 11/2016 | Datema et al. | |
| 9,643,657 B2 * | 5/2017 | West | B62D 25/168 |
| 9,694,671 B2 | 7/2017 | Wildgrube et al. | |
| 9,908,391 B2 * | 3/2018 | Williamson | B60J 7/185 |
| 10,414,067 B2 | 9/2019 | Datema et al. | |
| 10,611,326 B2 * | 4/2020 | McNeilus | B62D 25/168 |
| 10,843,379 B2 | 11/2020 | Rocholl et al. | |
| 11,072,374 B2 * | 7/2021 | Gandhi | B62D 37/02 |
| 2004/0058603 A1 * | 3/2004 | Hayes | C08G 18/44 |
| | | | 442/287 |
| 2017/0361492 A1 | 12/2017 | Datema et al. | |
| 2019/0121353 A1 | 4/2019 | Datema et al. | |
| 2019/0344475 A1 | 11/2019 | Datema et al. | |
| 2020/0078986 A1 | 3/2020 | Clifton et al. | |
| 2020/0094671 A1 | 3/2020 | Wildgrube et al. | |
| 2020/0130746 A1 | 4/2020 | Calliari et al. | |
| 2020/0230841 A1 | 7/2020 | Datema et al. | |
| 2020/0230842 A1 | 7/2020 | Datema et al. | |
| 2020/0262328 A1 | 8/2020 | Nelson et al. | |
| 2020/0265656 A1 | 8/2020 | Koga et al. | |
| 2020/0290852 A1 | 9/2020 | Rosencrance | |
| 2020/0317065 A1 | 10/2020 | Lombardo | |
| 2020/0317486 A1 | 10/2020 | Puszkiewicz et al. | |
| 2020/0346657 A1 | 11/2020 | Clifton et al. | |
| 2020/0346854 A1 | 11/2020 | Rocholl et al. | |
| 2020/0346855 A1 | 11/2020 | Rocholl et al. | |
| 2020/0346857 A1 | 11/2020 | Rocholl et al. | |
| 2020/0346858 A1 | 11/2020 | Buege et al. | |
| 2020/0346859 A1 | 11/2020 | Buege et al. | |
| 2020/0348681 A1 | 11/2020 | Clifton et al. | |

\* cited by examiner

FABRIC FENDER

CROSS-REFERENCE TO RELATED PATENT APPLICATION

The present application claims the benefit of and priority to U.S. Provisional Patent Application No. 62/883,393, filed Aug. 6, 2019, the entire disclosure of which is incorporated by reference herein.

BACKGROUND

The present disclosure relates to panels and/or fenders for vehicles such as concrete mixer and transportation vehicles.

SUMMARY

One implementation of the present disclosure is a fender for a vehicle, according to an exemplary embodiment. The fender includes a first set of an inner member and an outer member at a first position, and a second set of the inner member and the outer member at a second position that is longitudinally offset from the first position. The fender also includes a fabric disposed between the inner member and the outer member of the first set at a first end and the inner member and the outer member of the second set at a second end. The fabric extends longitudinally between the first set and the second set.

Another implementation of the present disclosure is a commercial vehicle, according to an exemplary embodiment. The commercial vehicle includes tractive elements, a primary mover, and a fender for the tractive elements. The primary mover is configured to drive the tractive elements. The fender includes a fabric, a first inner member and a first outer member positioned at a first end of the fabric, and a second inner member and a second outer member positioned at a second end of the fabric that is opposite the first end. The fabric extends longitudinally between the first inner member and the first outer member and the second inner member and the second outer member.

Another implementation of the present disclosure is a chassis assembly for a commercial vehicle, according to an exemplary embodiment. The chassis assembly includes a frame, tractive elements, and a fender. The frame extends in a longitudinal direction. The tractive elements are coupled with the frame. The fender includes a fabric, a first inner member and a first outer member, and a second inner member and a second outer member. The first inner member and the first outer member are positioned at a first end of the fabric. The second inner member and the second outer member are positioned at a second end of the fabric that is opposite the first end. The fabric extends longitudinally between the first inner member and the first outer member and the second inner member and the second outer member.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, a fender for a vehicle (e.g., a concrete mixer vehicle) includes a first laterally extending inner member and a first laterally extending outer member. The fender also includes a second laterally extending inner member and a second laterally extending outer member that are longitudinally positioned a distance away from the first laterally extending inner member and the first laterally extending outer member. A fabric is stretched and/or loaded in tension between the first laterally extending inner/outer members and the second laterally extending inner/outer members. A longitudinal member can extend between the first laterally extending inner/outer members. The fender can include various laterally extending members spaced along a longitudinal length of the fender. The fabric is held between the first laterally extending outer and inner members at a first end, and between the second laterally extending outer and inner members at a second end.

Concrete Mixer Truck

Figure 1:
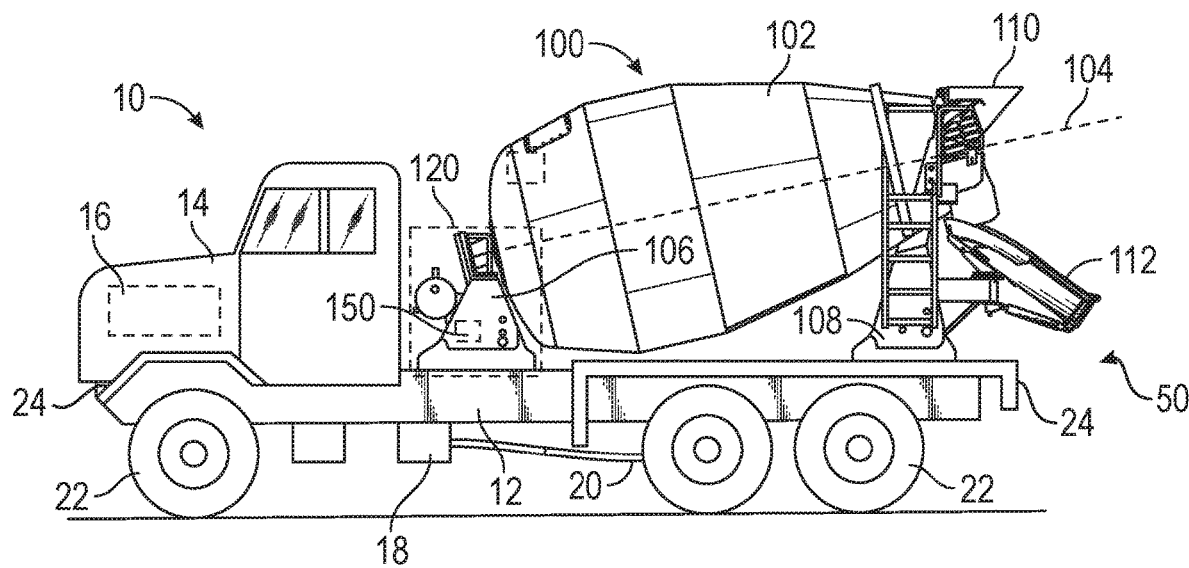
FIG. 1 is a side view of a concrete mixer truck with a drum assembly and a control system, according to an exemplary embodiment.
Figure 2:
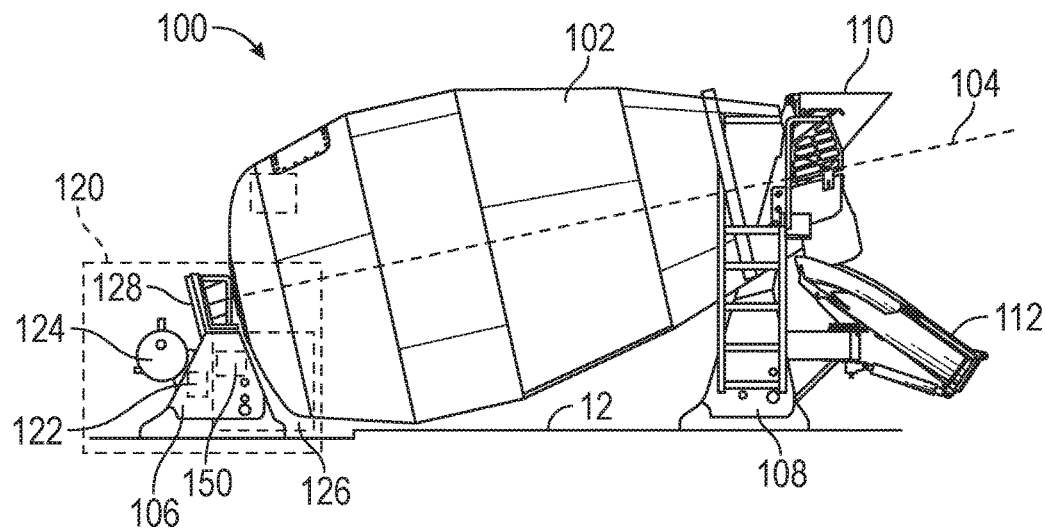
FIG. 2 is a detailed side view of the drum assembly of the concrete mixer truck of FIG. 1, according to an exemplary embodiment.

According to the exemplary embodiment shown in FIGS. 1-2, a vehicle (e.g., a commercial vehicle, a refuse vehicle, etc.), shown as concrete mixer truck 10, includes a drum assembly, shown as drum assembly 100, and a control system, shown as drum control system 150. According to an exemplary embodiment, the concrete mixer truck 10 is configured as a rear-discharge concrete mixer truck. In other embodiments, the concrete mixer truck 10 is configured as a front-discharge concrete mixer truck. As shown in FIG. 1, the concrete mixer truck 10 includes a chassis (e.g., a frame member, a support member, a structural member, etc.), shown as frame 12, and a cab, shown as cab 14, coupled to the frame 12 (e.g., at a front end thereof, etc.). The drum assembly 100 is coupled to the frame 12 and disposed behind the cab 14 (e.g., at a rear end thereof, etc.), according to the exemplary embodiment shown in FIG. 1. In other embodiments, at least a portion of the drum assembly 100 extends in front of the cab 14. The cab 14 may include various components to facilitate operation of the concrete mixer truck 10 by an operator (e.g., a seat, a steering wheel, hydraulic controls, a user interface, switches, buttons, dials, etc.).

As shown in FIGS. 1 and 2, the concrete mixer truck 10 includes a prime mover, shown as engine 16. As shown in FIG. 1, the engine 16 is coupled to the frame 12 at a position beneath the cab 14. The engine 16 may be configured to utilize one or more of a variety of fuels (e.g., gasoline, diesel, bio-diesel, ethanol, natural gas, etc.), according to various exemplary embodiments. According to an alternative embodiment, the prime mover additionally or alternatively includes one or more electric motors and/or generators, which may be coupled to the frame 12 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, a genset, etc.), and/or from an external power source (e.g., overhead power lines, etc.) and provide power to systems of the concrete mixer truck 10.

As shown in FIG. 1, the concrete mixer truck 10 includes a power transfer device, shown as transmission 18. In one embodiment, the engine 16 produces mechanical power (e.g., due to a combustion reaction, etc.) that flows into the transmission 18. As shown in FIG. 1, the concrete mixer truck 10 includes a first drive system, shown as vehicle drive system 20, that is coupled to the transmission 18. The vehicle drive system 20 may include drive shafts, differentials, and other components coupling the transmission 18 with a ground surface to move the concrete mixer truck 10. As shown in FIG. 1, the concrete mixer truck 10 includes a plurality of tractive elements, shown as wheels 22, that engage a ground surface to move the concrete mixer truck 10. In one embodiment, at least a portion of the mechanical power produced by the engine 16 flows through the transmission 18 and into the vehicle drive system 20 to power at least a portion of the wheels 22 (e.g., front wheels, rear wheels, etc.). In one embodiment, energy (e.g., mechanical energy, etc.) flows along a first power path defined from the engine 16, through the transmission 18, and to the vehicle drive system 20.

As shown in FIGS. 1 and 2, the drum assembly 100 of the concrete mixer truck 10 includes a drum, shown as mixer drum 102. The mixer drum 102 is coupled to the frame 12 and disposed behind the cab 14 (e.g., at a rear and/or middle of the frame 12, etc.). As shown in FIGS. 1-2, the drum assembly 100 includes a second drive system, shown as drum drive system 120, that is coupled to the frame 12. As shown in FIGS. 1 and 2, the concrete mixer truck 10 includes a first support, shown as front pedestal 106, and a second support, shown as rear pedestal 108. According to an exemplary embodiment, the front pedestal 106 and the rear pedestal 108 cooperatively couple (e.g., attach, secure, etc.) the mixer drum 102 to the frame 12 and facilitate rotation of the mixer drum 102 relative to the frame 12. In an alternative embodiment, the drum assembly 100 is configured as a stand-alone mixer drum that is not coupled (e.g., fixed, attached, etc.) to a vehicle. In such an embodiment, the drum assembly 100 may be mounted to a stand-alone frame. The stand-alone frame may be a chassis including wheels that assist with the positioning of the stand-alone mixer drum on a worksite. Such a stand-alone mixer drum may also be detachably coupled to and/or capable of being loaded onto a vehicle such that the stand-alone mixer drum may be transported by the vehicle.

As shown in FIGS. 1 and 2, the mixer drum 102 defines a central, longitudinal axis, shown as axis 104. According to an exemplary embodiment, the drum drive system 120 is configured to selectively rotate the mixer drum 102 about the axis 104. As shown in FIGS. 1 and 2, the axis 104 is angled relative to the frame 12 such that the axis 104 intersects with the frame 12. According to an exemplary embodiment, the axis 104 is elevated from the frame 12 at an angle in the range of five degrees to twenty degrees. In other embodiments, the axis 104 is elevated by less than five degrees (e.g., four degrees, three degrees, etc.) or greater than twenty degrees (e.g., twenty-five degrees, thirty degrees, etc.). In an alternative embodiment, the concrete mixer truck 10 includes an actuator positioned to facilitate selectively adjusting the axis 104 to a desired or target angle (e.g., manually in response to an operator input/command, automatically according to a control scheme, etc.).

As shown in FIGS. 1 and 2, the mixer drum 102 of the drum assembly 100 includes an inlet, shown as hopper 110, and an outlet, shown as chute 112. According to an exemplary embodiment, the mixer drum 102 is configured to receive a mixture, such as a concrete mixture (e.g., cementitious material, aggregate, sand, etc.), with the hopper 110. The mixer drum 102 may include a mixing element (e.g., fins, etc.) positioned within the interior thereof. The mixing element may be configured to (i) agitate the contents of mixture within the mixer drum 102 when the mixer drum 102 is rotated by the drum drive system 120 in a first direction (e.g., counterclockwise, clockwise, etc.) and (ii) drive the mixture within the mixer drum 102 out through the chute 112 when the mixer drum 102 is rotated by the drum drive system 120 in an opposing second direction (e.g., clockwise, counterclockwise, etc.).

According to the exemplary embodiment shown in FIG. 2, the drum drive system is a hydraulic drum drive system. As shown in FIG. 2, the drum drive system 120 includes a pump, shown as pump 122; a reservoir, shown as fluid reservoir 124, fluidly coupled to the pump 122; and an actuator, shown as drum motor 126. The pump 122 and the drum motor 126 may be fluidly coupled. According to an exemplary embodiment, the drum motor 126 is a hydraulic motor, the fluid reservoir 124 is a hydraulic fluid reservoir, and the pump 122 is a hydraulic pump. The pump 122 may be configured to pump fluid (e.g., hydraulic fluid, etc.) stored within the fluid reservoir 124 to drive the drum motor 126.

According to an exemplary embodiment, the pump 122 is a variable displacement hydraulic pump (e.g., an axial piston pump, etc.) and has a pump stroke that is variable. The pump 122 may be configured to provide hydraulic fluid at a flow rate that varies based on the pump stroke (e.g., the greater the pump stroke, the greater the flow rate provided to the drum motor 126, etc.). The pressure of the hydraulic fluid provided by the pump 122 may also increase in response to an increase in pump stroke (e.g., where pressure may be directly related to work load, higher flow may result in higher pressure, etc.). The pressure of the hydraulic fluid provided by the pump 122 may alternatively not increase in response to an increase in pump stroke (e.g., in instances where there is little or no work load, etc.). The pump 122 may include a throttling element (e.g., a swash plate, etc.). The pump stroke of the pump 122 may vary based on the orientation of the throttling element. In one embodiment, the pump stroke of the pump 122 varies based on an angle of the throttling element (e.g., relative to an axis along which the pistons move within the axial piston pump, etc.). By way of example, the pump stroke may be zero where the angle of the throttling element is equal to zero. The pump stroke may increase as the angle of the throttling element increases. According to an exemplary embodiment, the variable pump stroke of the pump 122 provides a variable speed range of up to about 10:1. In other embodiments, the pump 122 is configured to provide a different speed range (e.g., greater than 10:1, less than 10:1, etc.).

In one embodiment, the throttling element of the pump 122 is movable between a stroked position (e.g., a maximum stroke position, a partially stroked position, etc.) and a destroked position (e.g., a minimum stroke position, a partially destroked position, etc.). According to an exemplary embodiment, an actuator is coupled to the throttling element of the pump 122. The actuator may be positioned to move the throttling element between the stroked position and the destroked position. In some embodiments, the pump 122 is configured to provide no flow, with the throttling element in a non-stroked position, in a default condition (e.g., in response to not receiving a stroke command, etc.). The throttling element may be biased into the non-stroked position. In some embodiments, the drum control system 150 is configured to provide a first command signal. In response to receiving the first command signal, the pump 122 (e.g., the throttling element by the actuator thereof, etc.) may be selectively reconfigured into a first stroke position (e.g., stroke in one direction, a destroked position, etc.). In some embodiments, the drum control system 150 is configured to additionally or alternatively provide a second command signal. In response to receiving the second command signal, the pump 122 (e.g., the throttling element by the actuator thereof, etc.) may be selectively reconfigured into a second stroke position (e.g., stroke in an opposing second direction, a stroked position, etc.). The pump stroke may be related to the position of the throttling element and/or the actuator.

According to another exemplary embodiment, a valve is positioned to facilitate movement of the throttling element between the stroked position and the destroked position. In one embodiment, the valve includes a resilient member (e.g., a spring, etc.) configured to bias the throttling element in the destroked position (e.g., by biasing movable elements of the valve into positions where a hydraulic circuit actuates the throttling element into the destroked positions, etc.). Pressure from fluid flowing through the pump 122 may overcome the resilient member to actuate the throttling element into the stroked position (e.g., by actuating movable elements of the valve into positions where a hydraulic circuit actuates the throttling element into the stroked position, etc.).

The drum motor 126 is positioned to drive the rotation of the mixer drum 102. In some embodiments, the drum motor 126 is a fixed displacement motor. In some embodiments, the drum motor 126 is a variable displacement motor. In one embodiment, the drum motor 126 operates within a variable speed range up to about 3:1 or 4:1. In other embodiments, the drum motor 126 is configured to provide a different speed range (e.g., greater than 4:1, less than 3:1, etc.). According to an exemplary embodiment, the speed range of the drum drive system 120 is the product of the speed range of the pump 122 and the speed range of the drum motor 126. The drum drive system 120 having a variable pump 122 and a variable drum motor 126 may thereby have a speed range that reaches up to 30:1 or 40:1 (e.g., without having to operate the engine 16 at a high idle condition, etc.). According to an exemplary embodiment, increased speed range of the drum drive system 120 having a variable displacement motor and a variable displacement pump relative to a drum drive system having a fixed displacement motor frees up boundary limits for the engine 16, the pump 122, and the drum motor 126. Advantageously, with the increased capacity of the drum drive system 120, the engine 16 does not have to run at either high idle or low idle during the various operating modes of the drum assembly 100 (e.g., mixing mode, discharging mode, filling mode, etc.), but rather the engine 16 may be operated at a speed that provides the most fuel efficiency and most stable torque. Also, the pump 122 and the drum motor 126 may not have to be operated at displacement extremes to meet the speed requirements for the mixer drum 102 during various applications, but can rather be modulated to the most efficient working conditions (e.g., by the drum control system 150, etc.).

As shown in FIG. 2, the drum drive system 120 includes a drive mechanism, shown as drum drive wheel 128, coupled to the mixer drum 102. The drum drive wheel 128 may be welded, bolted, or otherwise secured to the head of the mixer drum 102. The center of the drum drive wheel 128 may be positioned along the axis 104 such that the drum drive wheel 128 rotates about the axis 104. According to an exemplary embodiment, the drum motor 126 is coupled to the drum drive wheel 128 (e.g., with a belt, a chain, a gearing arrangement, etc.) to facilitate driving the drum drive wheel 128 and thereby rotate the mixer drum 102. The drum drive wheel 128 may be or include a sprocket, a cogged wheel, a grooved wheel, a smooth-sided wheel, a sheave, a pulley, or still another member. In other embodiments, the drum drive system 120 does not include the drum drive wheel 128. By way of example, the drum drive system 120 may include a gearbox that couples the drum motor 126 to the mixer drum 102. By way of another example, the drum motor 126 (e.g., an output thereof, etc.) may be directly coupled to the mixer drum 102 (e.g., along the axis 104, etc.) to rotate the mixer drum 102.

Fenders

Referring to FIG. 1, the concrete mixer truck 10 can include one or more fenders, panel members, decorative members, shell members, wings, splash-guards, wheel wells, mud-guards, barriers, etc., shown as fenders 24. The fenders 24 can be positioned longitudinally and/or laterally along the concrete mixer truck 10 and may be configured to facilitate protecting various internal components of the concrete mixer truck 10. The fenders 24 may extend at least partially along an entire longitudinal length of the concrete mixer truck 10 or may extend completely along the longitudinal length of the concrete mixer truck 10. Likewise, the fenders 24 can be configured to extend in a lateral direction along a lateral width of the concrete mixer truck 10. The fenders 24 can be any panel member (e.g., a thin, elongated member) that provide structural support, decorative/aesthetic appeal, and splash-guard for the concrete mixer truck 10. In some embodiments, the fenders 24 are configured to provide a barrier to facilitate preventing rocks, debris, etc., from being kicked up or thrown by the wheels 22. In this way, the fenders 24 can facilitate protecting the concrete mixer truck 10 from objects that may be propelled by the wheels 22. Additionally, the fenders 24 can facilitate protecting the concrete mixer truck 10 from kicking up debris, objects, liquids (e.g., mud, water, etc.) towards other vehicles.

The fenders 24 can be provided as a portion of a chassis or frame assembly 50 (shown in FIGS. 1, 3, and 5-10). The chassis assembly 50 can include frame 12, wheels 22, and various other components, members, etc., that are coupled with frame 12.

Referring particularly to FIGS. 3-10, the fenders 24 can each include a retaining member, a structural member, an inner retaining member, an inner support member, etc., shown as inner member 202. The inner member 202 can be configured to extend laterally and/or longitudinally along the concrete mixer truck 10 and may be an elongated planar member. The inner member 202 can be an arcuate member, an elongated planar member, etc., and may have a longitudinal width 234.

The fenders 24 also include an outer retaining member, an outer support member, etc., shown as outer member 206 in FIGS. 5, 6, 8, 9, and 10. The outer member 206 can have a same general shape as the inner member 202 and may have a same longitudinal width 234 of the inner member 202. The outer member 206 is similar to the inner member 202 (e.g., a same width, a similar shape, etc.) and may correspond in shape to the inner member 202. In other embodiments, the outer member 206 has a dissimilar shape or a different shape than the inner member 202 (e.g., a washer). For example, the outer member 206 may be configured as a plurality of washers (e.g., thin cylindrical members with a through-hole or bore) that are positioned on an opposite side of the inner member 202. In other embodiments, the outer member 206 has an elongated shape (as shown in the FIGURES), whereas the inner member 202 has the form of multiple washers. The fender 24 includes a flexible material, a fabric, a composite material, a woven material, a coated fabric, etc., shown as fabric 204. The fabric 204 includes a first or proximate end 208 and a second or distal end 210. The first end 208 of the fabric 204 is retained by the outer member 206 and the inner member 202. The second end 210 of the fabric 204 is retained by another outer member 206 and another inner member 202. The first end 208 and the second end 210 of the fabric 204 can be retained such that the fabric 204 is held in tension. A cross-sectional shape of the inner member 202 and/or the outer member 206 corresponds to a cross-sectional shape of the fabric 204. An interior, inner, or inwards facing surface 205 of the fabric 204 can engage (e.g., directly, or indirectly with spacers) or be in contact with a corresponding outer surface or outer face of the inner member 202. Likewise, an exterior, outer, or outwards facing surface 207 of the fabric 204 can engage (e.g., directly, or indirectly with spacers) or be in contact with a corresponding inner/interior surface or face of the outer member 206.

The fabric 204 and/or the fender 24 defines a longitudinal axis 312 that extends through the fabric 204 and the fender 24. The inner member 202 and the outer member 206 extend in a generally lateral direction relative to the longitudinal axis 312. The fabric 204 can include grommets, attachment members, apertures, holes, clips, retainers, etc., shown as grommets 224. The grommets 224 can be positioned at opposite ends of the fabric 204 and are configured to receive fasteners, cylindrical members, posts, etc., therethrough. Various sets of the grommets 224 can be positioned at the proximate end 208 and the distal end 210 of the fabric 204. A lateral axis 313 extends in a direction that is substantially perpendicular to the longitudinal axis 312. A vertical axis 315 extends in a vertical direction that is perpendicular to both the lateral axis 313 and the longitudinal axis 312. The vertical axis 315, the longitudinal axis 312, and the lateral axis 313 define vertical directions, longitudinal directions, and lateral directions, respectively. It should be understood that all references herein to "laterally extending" "upwards" "downwards" etc., can be understood with reference to the longitudinal axis 312, the lateral axis 313, and the vertical axis 315.

Figure 3:
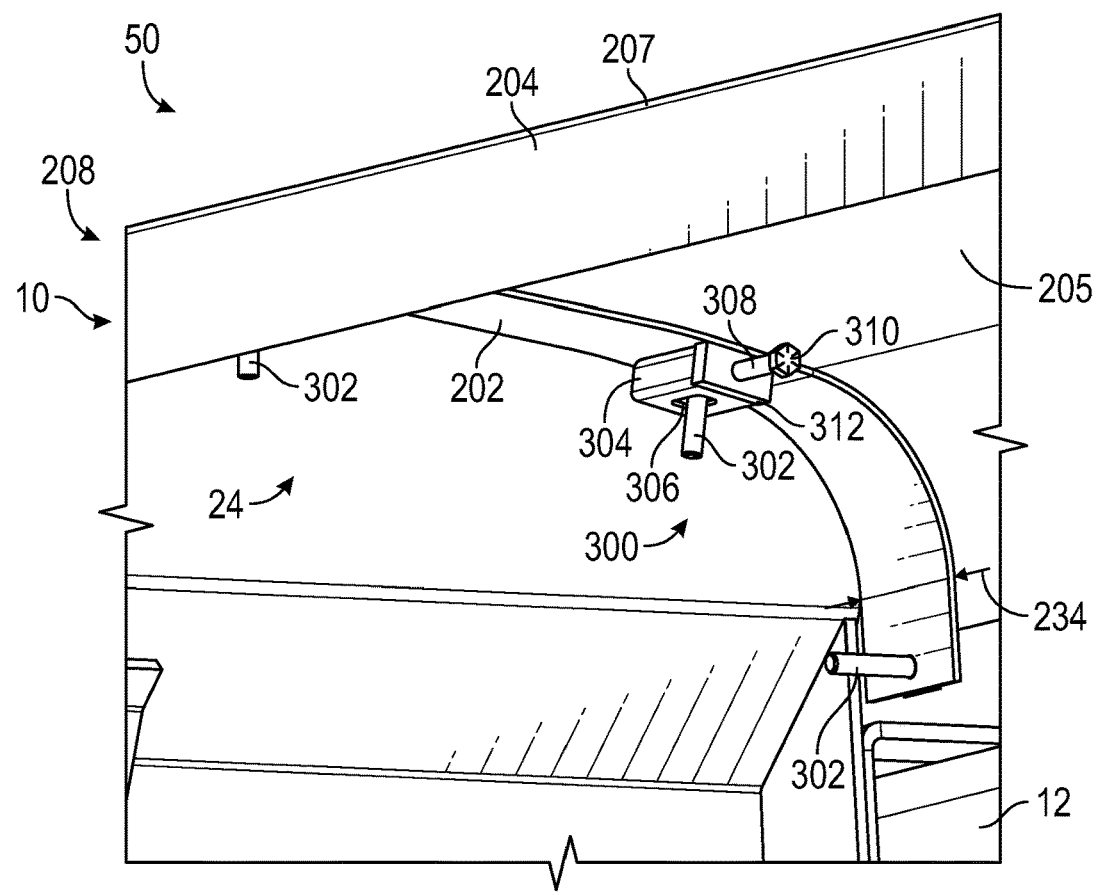
FIG. 3 is a perspective view of a fender of the concrete mixer truck of FIG. 1 including a tensioning mechanism, according to an exemplary embodiment.
Figure 4:
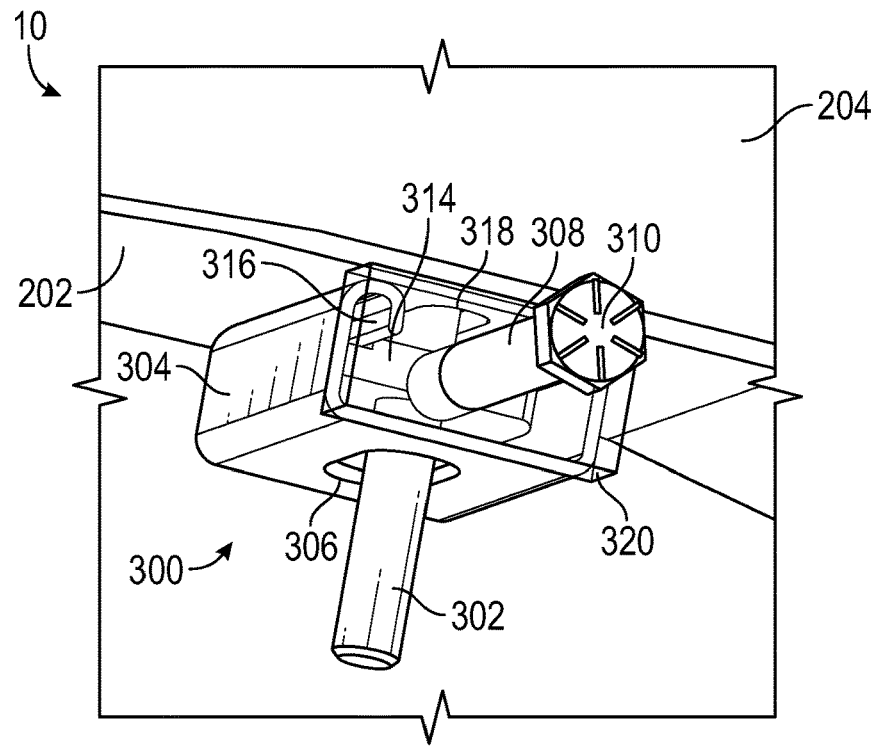
FIG. 4 is a perspective view of the tensioning mechanism of FIG. 3, according to an exemplary embodiment.

Referring particularly to FIGS. 3 and 4, in some embodiments, the inner member 202 includes one or more tensioning mechanisms 300. The tensioning mechanism 300 includes an adjustment member, a fastener, etc., shown as adjustment member 308. The adjustment member 308 can include an engagement portion 310 (e.g., a hex shape, a square shape, etc.) that is configured to facilitate adjusting the tension of the fabric 204.

The tensioning mechanism 300 includes a cylindrical member, a post, a pin, an engagement member, etc., shown as retaining member 302. Retaining member 302 can be any cylindrical or elongated member or hook that is configured to engage the fabric 204 (e.g., that is configured to extend through a corresponding one of the grommets 224).

The tensioning mechanism 300 includes a body member, a structural member, a frame, etc., shown as body 304. The body 304 can include a slot, a hole, an aperture, etc., shown as slot 306 through which the retaining member 302 extends. The body 304 can be fixedly coupled or integrally formed with the inner member 202. The inner member 202 includes a corresponding hole, slot, aperture, etc., shown as slot 318, through which an opposite end of the retaining member 302 extends. In this way, the retaining member 302 can extend through the slot 306 of the body 304 at a first or proximate or inner end, while a second, distal, or outer end of the retaining member 302 extends through the slot 318 and passes through the grommet 224 of the fabric 204.

The retaining member 302 can be fixedly coupled or integrally formed with a guide member, a block, etc., shown as guide member 314. The guide member 314 is configured to slidably engage a corresponding track 316 of the body 304 such that the guide member 314 can translate longitudinally relative to the body 304. The guide member 314 can include a slot, a groove, a track, etc., that is configured to receive the track 316 of the body 304. The guide member 314 can be driven to translate by the adjustment member 308, thereby adjusting the tension of the fabric 204.

The adjustment member 308 may extend through a correspondingly shaped and sized aperture of a structural member 320 (e.g., a sidewall) of the body 304. The structural member 320 includes threads that are configured to threadingly couple with and engage corresponding threads of the adjustment member 308. The adjustment member 308 can be adjusted (e.g., twisted or rotated in a clockwise or counter-clockwise direction) to adjust a longitudinal position of the retaining member 302 and the guide member 314. The guide member 314 may be contacted by the adjustment member 308 (e.g., by an end of the adjustment member 308) and pushed or driven by the adjustment member 308 to translate longitudinally (e.g., to translate in a direction along longitudinal axis 312). In this way, the adjustment member 308 can be driven (e.g., by coupling an adjustment tool to the engagement portion 310) to adjust tension on the fabric 204.

The tensioning mechanism 300 can be fixedly coupled with the inner member 202. Multiple tensioning mechanisms 300 can be positioned along the inner member 202 such that the tension of the fabric 204 can be adjusted in various locations. In some embodiments, the tensioning mechanisms 300 are disposed along the inner members 202 at either end (e.g., at the first or proximate end 208 and at the second or distal end 210) of the fabric 204. In this way, the tensioning of the fabric 204 can be adjusted at both ends. In other embodiments, the tensioning mechanism(s) 300 is/are positioned at only one of the ends of the fabric 204 (e.g., only at the first/proximate end 208 or only at the second/distal end 210). If the tensioning mechanism(s) 300 is/are positioned at only one of the ends of the fabric 204 (e.g., only at the first/proximate end 208 of the fabric), the opposite end of the fabric 204 can be fastened or otherwise fixedly coupled with the inner member 202 and the outer member 206.

In some embodiments, the outer member 206 includes a slot that is similar to the slot 318 of the inner member 202. The slot of the outer member 206 can be aligned with the slot 318 of the inner member 202. The end of the retaining member 302 that extends through the slot 318 of the inner member 202 may also pass through the slot of the outer member 206. The end of the retaining member 302 can include an enlarged portion that has a diameter greater than a width of the slot of the outer member 206. In this way, the end of the retaining member 302 can retain the outwards facing surface 207 of the fabric 204.

Figure 5:
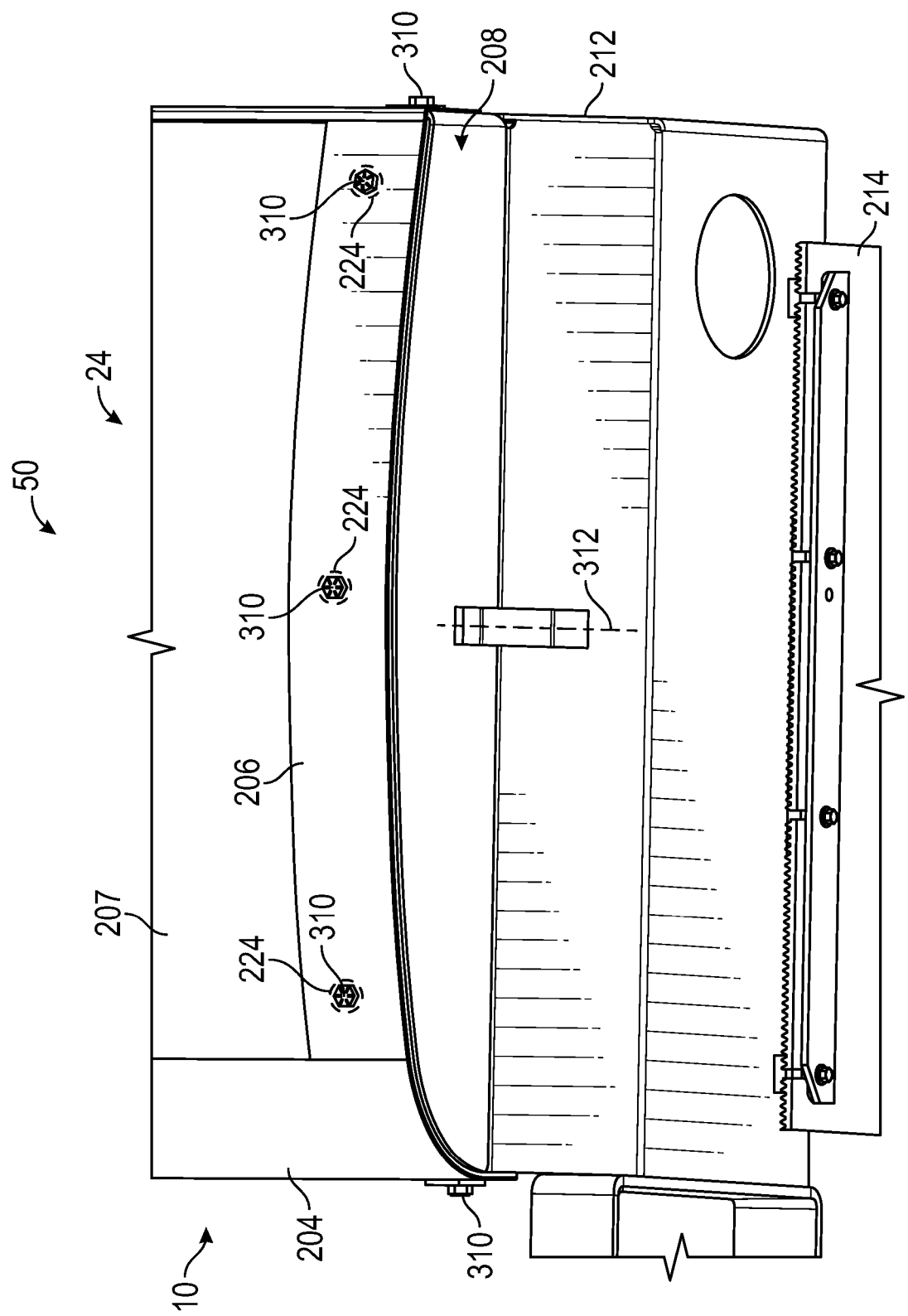
FIG. 5 is a perspective view of the fender of the concrete mixer truck of FIG. 1, according to an exemplary embodiment.
Figure 6:
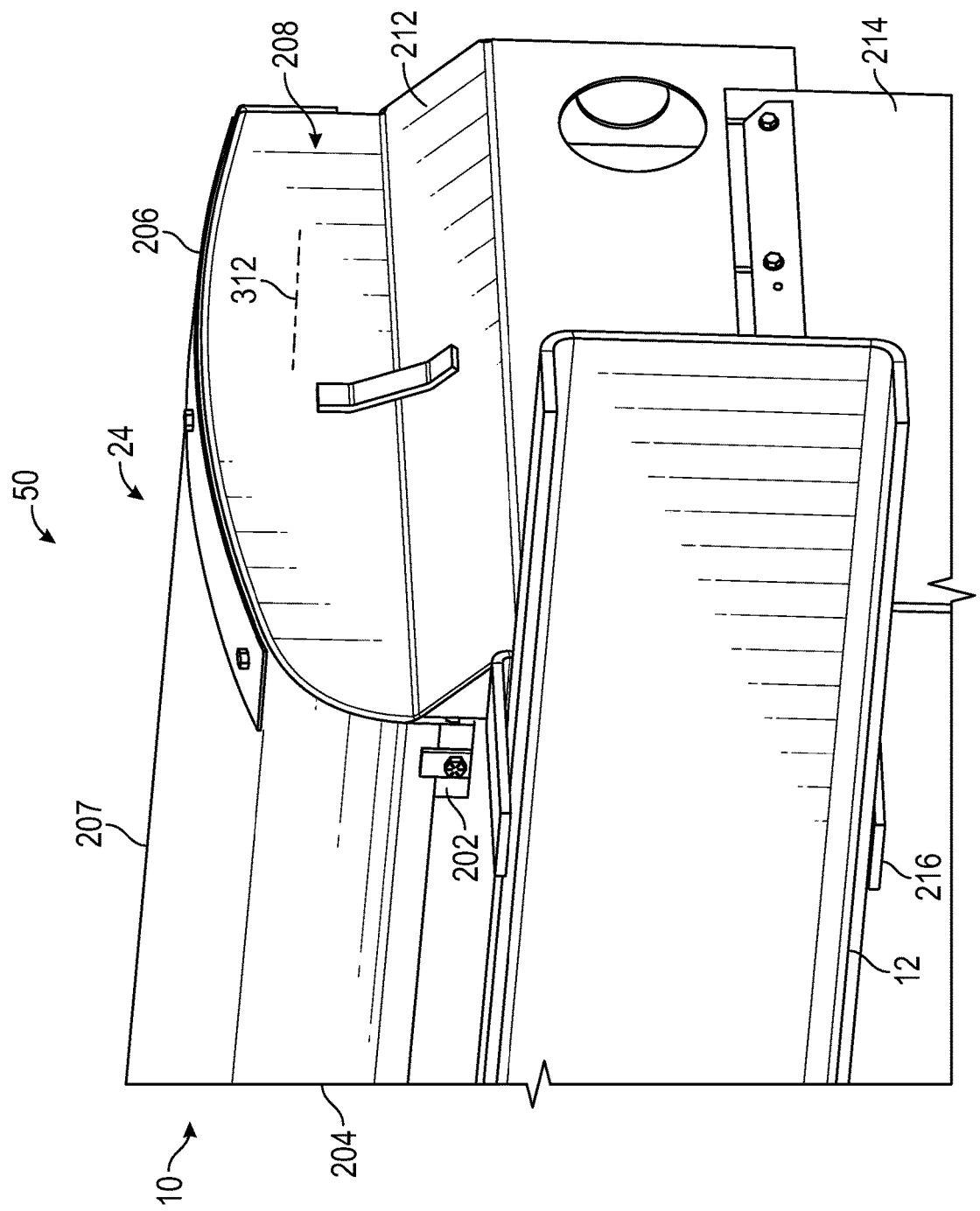
FIG. 6 is a perspective view of the fender of the concrete mixer truck of FIG. 1, according to an exemplary embodiment.
Figure 7:
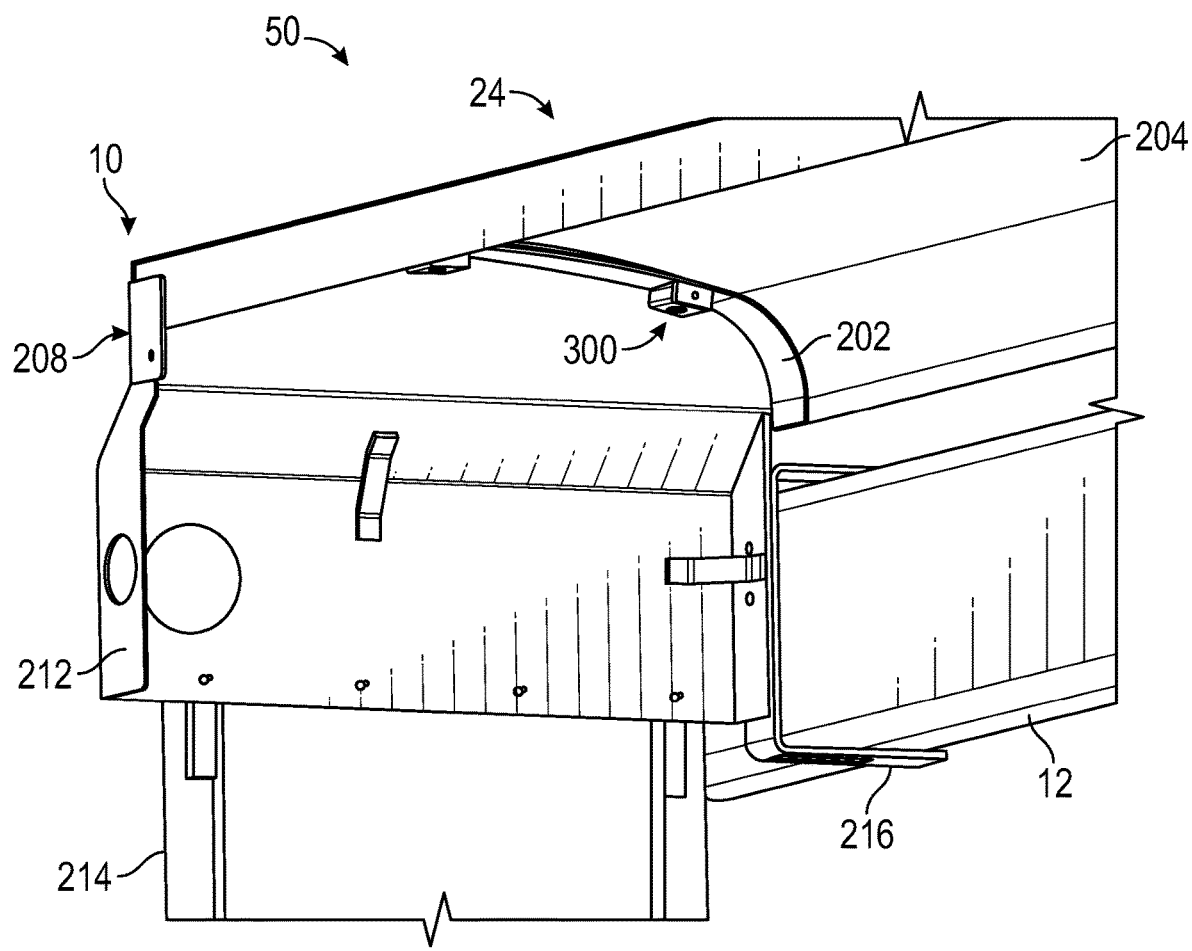
FIG. 7 is a perspective view of the fender of the concrete mixer truck of FIG. 1, according to an exemplary embodiment.

Referring particularly to FIGS. 5 and 6, the fender 24 can include an end member, a structural member, a shield member, etc., shown as end member 212. The end member 212 can be integrally formed or fixedly coupled with the inner member 202. A first end member 212 can be positioned at the first end 208 of the fabric 204, while a second end member 212 can be positioned at the second end 210 of the fabric 204. One, or both of the end members 212 can include a rubber mat, a splash shield, a mud flap, etc., shown as flap 214. The flap 214 is suspended (e.g., with fasteners) from the end member 212 such that the flap 214 can swing or hang from the end member 212. The end members 212 can also include various lighting components (e.g., light emitting devices) to meet various lighting requirements, in addition to supporting the flaps 214.

Each of the end members 212 can include a bracket, a structural member, a support member, etc., shown as bracket 216. The bracket 216 can be an elongated member, a structural member, a U-shaped member, etc., that is configured to fixedly couple the fender 24 with the frame 12. The bracket 216 can extend towards the frame 12 and may include one or more tabs, flanges, protrusions, etc., that extend above and below an upper and lower side of the frame 12, respectively. The bracket 216 can be fixedly coupled with the frame 12 and supports the fender 24. In this way, the fender 24 is fixedly coupled with the frame 12 of the concrete mixer truck 10 through the brackets 216.

Figure 8:
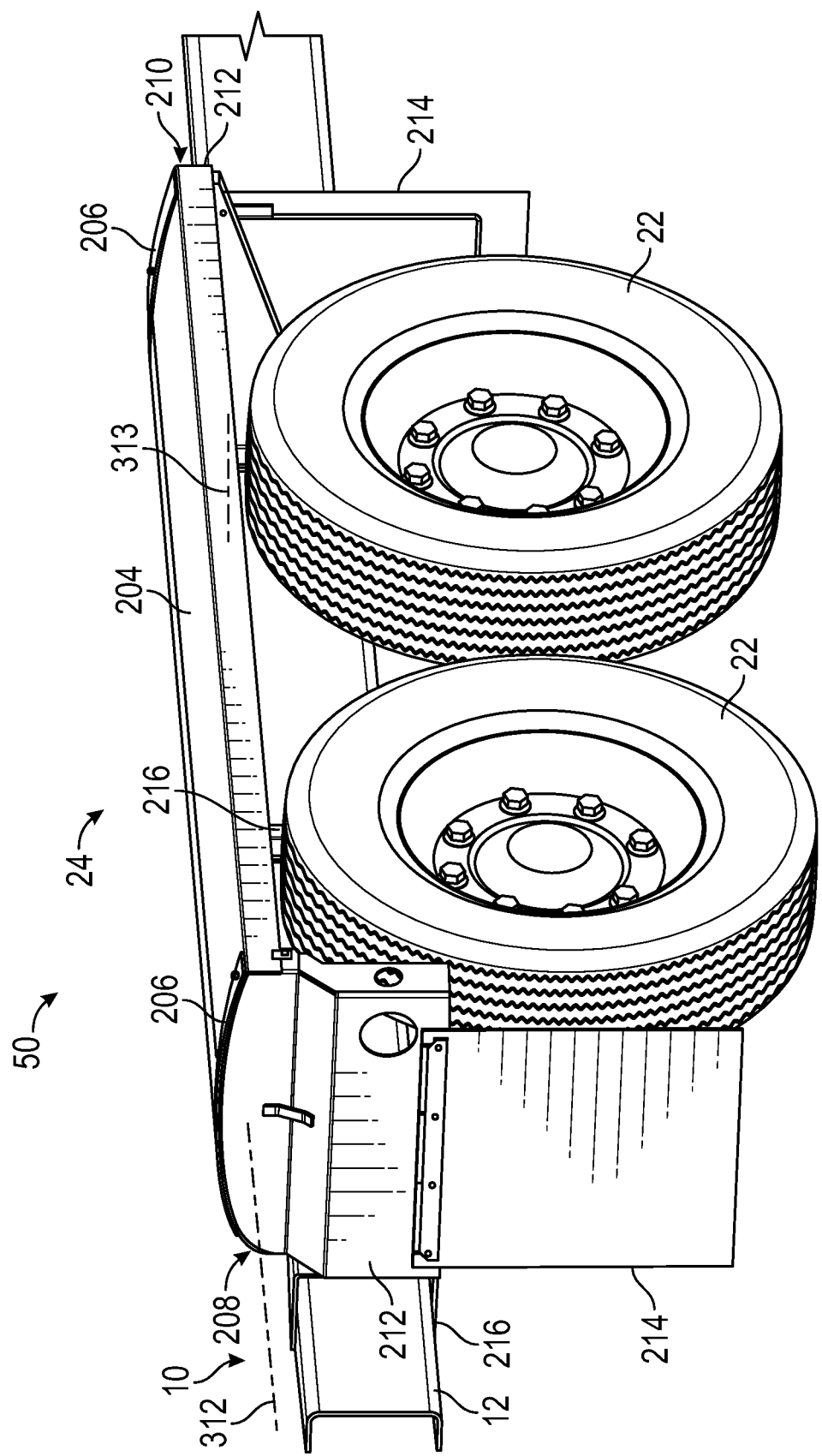
FIG. 8 is a perspective view of the fender of the concrete mixer truck of FIG. 1, according to an exemplary embodiment.
Figure 9:
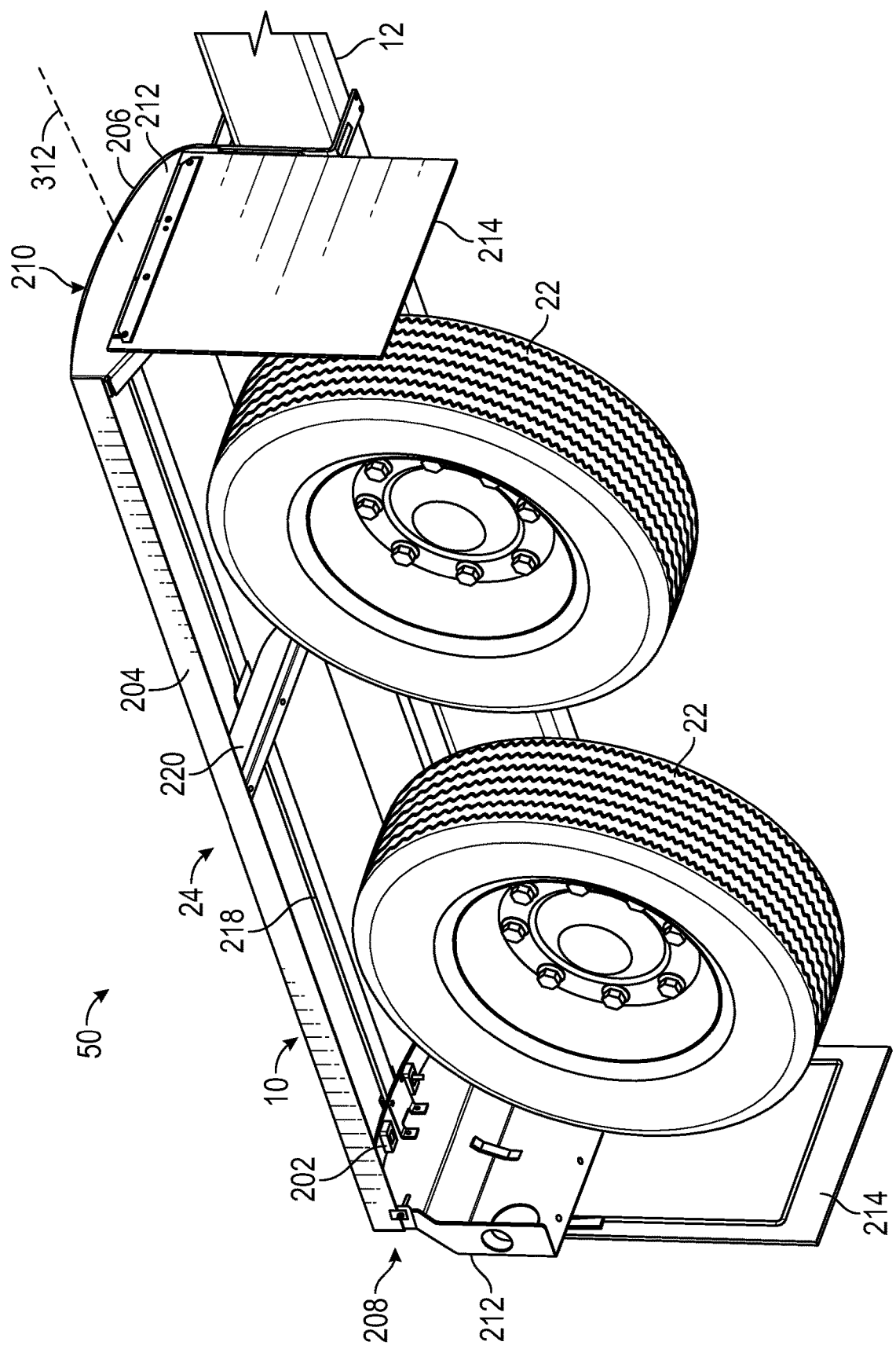
FIG. 9 is a perspective view of the fender of the concrete mixer truck of FIG. 1, according to an exemplary embodiment.
Figure 10:
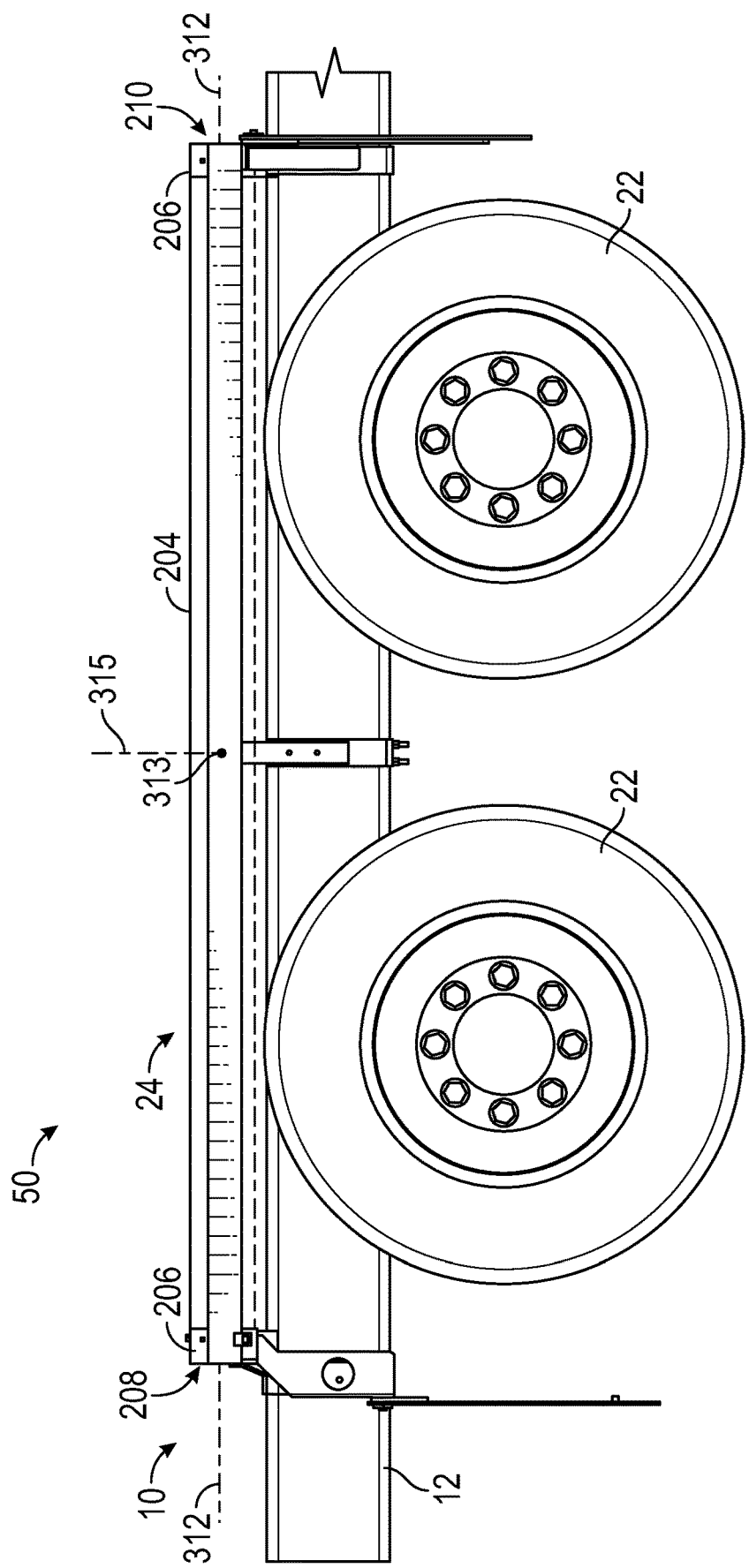
FIG. 10 is a side view of the fender of the concrete mixer truck of FIG. 1, according to an exemplary embodiment.

Referring particularly to FIGS. 8-10, the fabric 204 is stretched or loaded in tension between the inner members 202 and the outer members 206 at either end of the fabric 204 (e.g., at the first/proximate end 208 and the second/distal end 210). The fabric 204 can be loaded in tension in either the longitudinal direction (e.g., along the longitudinal axis 312) or in the lateral direction (e.g., along the lateral axis 313) or both. Portions of the fabric 204 at the first/proximate end 208 and the second/distal end 210 are positioned between the inner member 202 and the outer member 206 and fixedly coupled with the inner member 202 and the outer member 206. The tension on the fabric 204 between the first/proximate end 208 and the second/distal end 210 can be adjustable (e.g., with one or more tensioning mechanisms 300) or may be non-adjustable (e.g., fixed with fasteners or hooks).

The fender 24 can include a longitudinal member, a longitudinal support member, a bar, a beam, etc., shown as longitudinal member 218. The longitudinal member 218 can extend between the inner members 202 that are positioned at either end of the fabric 204 (e.g., at the first/proximate end 208 and the second/distal end 210 of the fabric).

The fender 24 can include one or more lateral members, lateral support members, bars, beams, etc., shown as lateral members 220. The lateral members 220 can extend in a direction that is perpendicular to the longitudinal member 218 or perpendicular to longitudinal axis 312. The lateral members 220 can be cross-beams or support members that have an outer periphery that corresponds to an inner periphery of the fabric 204. The lateral members 220 can be spaced apart longitudinally along longitudinal axis 312.

It should be understood that while the fender 24 is shown in FIGS. 3-10 configured as an over-wheel fender, the fender 24 can be any panel, body, decorative, protective member, etc., of the concrete mixer truck 10. For example, the fender 24 can be a front fender, a rear fender, a wheel well, a storage compartment panel, a splash shield, storage compartment sides, trunk lids, etc., or any other panel member of the concrete mixer truck 10. Additionally, the fender 24 can be used on any other vehicle (e.g., a forestry vehicle, an automobile, a bus, a truck, a refuse vehicle, a fire truck, etc.).

The fender 24 can have a uniform cross-sectional shape along the longitudinal length of the fender 24, or may have a varying cross-sectional shape along the longitudinal length of the fender 24. For example, the fender 24 may be generally straight or uniform in the longitudinal direction (e.g., along the longitudinal axis 312), or may be curved, segmented, etc. For example, the lateral member 220 can vertically in-line with the inner members 202, or may be elevated relative to the inner members 202. In this way, the fender 24 can have varying vertical heights along its longitudinal length. In this way, the fender 24 may be contoured over the wheels 22.

The fabric 204 can be manufactured from a resilient, flexible, and durable material. Specifically, the fabric 204 can be a tightly woven material. The fabric 204 may be coated to provide additional resistance to penetration by water, liquid, mud, etc. Advantageously, the fender 24 is a lightweight fender and uses fabric as opposed to steel, aluminum, or other heavy materials. The fender 24 may be light enough for a single person to replace on the concrete mixer truck 10. Advantageously, the fender 24 is an easily-replaceable, lightweight, robust, and inexpensive fender when compared to other fenders (e.g., steel fenders, aluminum fenders, etc.). The fabric 204 may have greater resilience than plastic or metal to propelled objects since the fabric 204 is flexible. For example, since the fabric 204 is flexible and/or resilient, the fabric 204 may elastically deform when impacted by a propelled object as opposed to shattering or denting (as in the case of steel, plastic, or brittle materials). The fabric 204 may be coated to prevent water from seeping through while the concrete mixer truck 10 is driving through water or moist areas (e.g., driving through puddles). Advantageously, the fabric 204 can be shaped and/or stretched to conform to the various frame members (e.g., the inner members 202, the outer members 206, the longitudinal member(s) 218, the lateral member(s) 220, etc.). Additionally, the fabric 204 may be manufactured from a woven material that has a sufficiently tight weave to prevent the fabric 204 from moving or shifting during transportation of the concrete mixer truck 10 due to the air flow of driving. Coating the fabric 204 (e.g., with an epoxy, a resin, a rubber, etc.) may also facilitate a more durable fender 24 with a longer life. The fabric 204 can be a woven material such as polyparaphenylene terephthalamide, a canvas, etc., or any other similar material. In an exemplary embodiment, the fabric 204 is a polyester fabric (e.g., a woven polyester material) that is coated in polyvinyl chloride (PVC).

Figure 11:
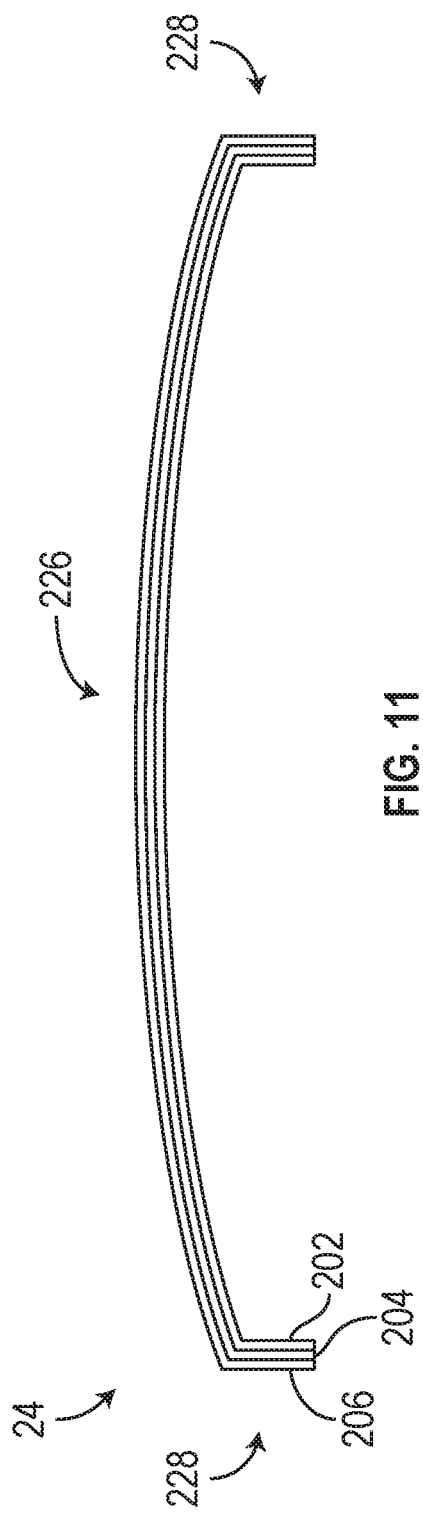
FIGS. 11-13 are various side sectional views of the fender of the concrete mixer truck of FIG. 1, according to various exemplary embodiments.
Figure 13:
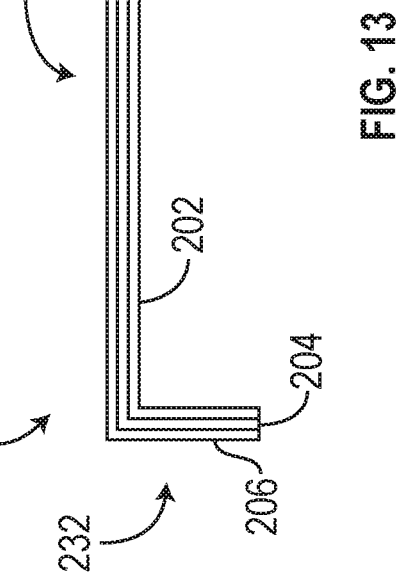
Figure 12:
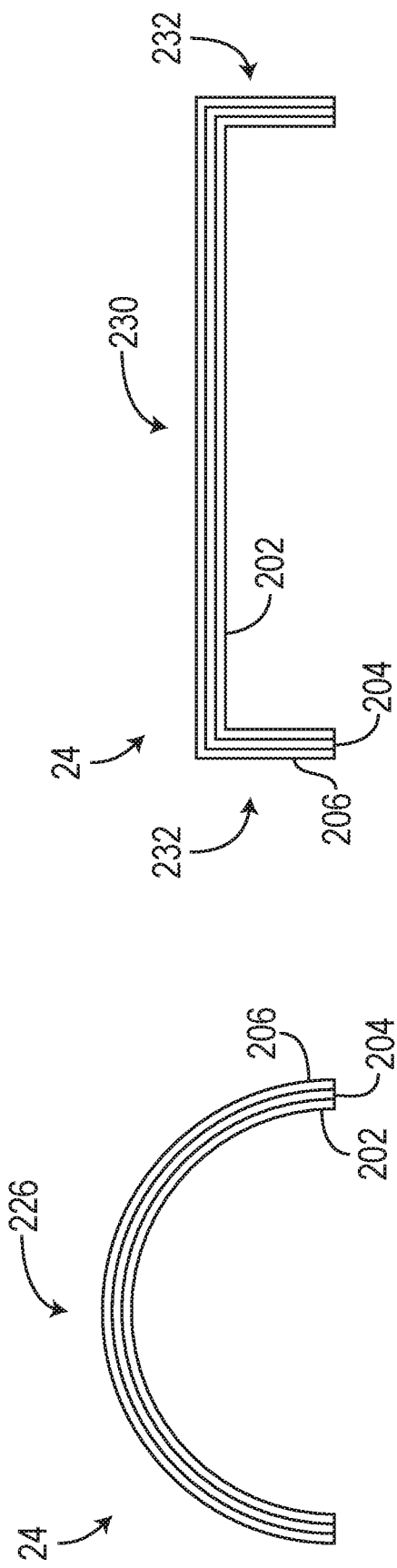

Referring particularly to FIGS. 11-13, the fender 24 can have various cross-sectional shapes. The cross-sectional shape of the fender 24 can be defined by the inner member 202 and the outer member 206. The fabric 204 is positioned or "sandwiched" between the inner member 202 and the outer member 206, and the cross-sectional shape of the fender 24 is thereby defined.

Referring particularly to FIG. 11, the fender 24 may have an arcuate or curved portion 226 and generally straight portions 228. The straight portions 228 can extend from the curved portion 226 at either ends of the curved portion 226. Referring particularly to FIG. 12, the fender 24 may have a curved or arcuate portion 226 without the straight portions 228. As shown in FIG. 13, the fender 24 may have a straight portion 230 with straight portions 232 positioned at either ends of the straight portion 230. It should be understood that the cross-sectional shape of the fender 24 can be defined by an outer surface of the inner members 202 and/or an inner surface of the outer members 206. The cross-sectional shape of the fender 24 can have any combination of curved or arcuate portions, straight portions, diagonal portions, etc., and all such shapes, contours, etc., of the fender 24 should be understood to be within the scope of the present disclosure.

Figure 14:
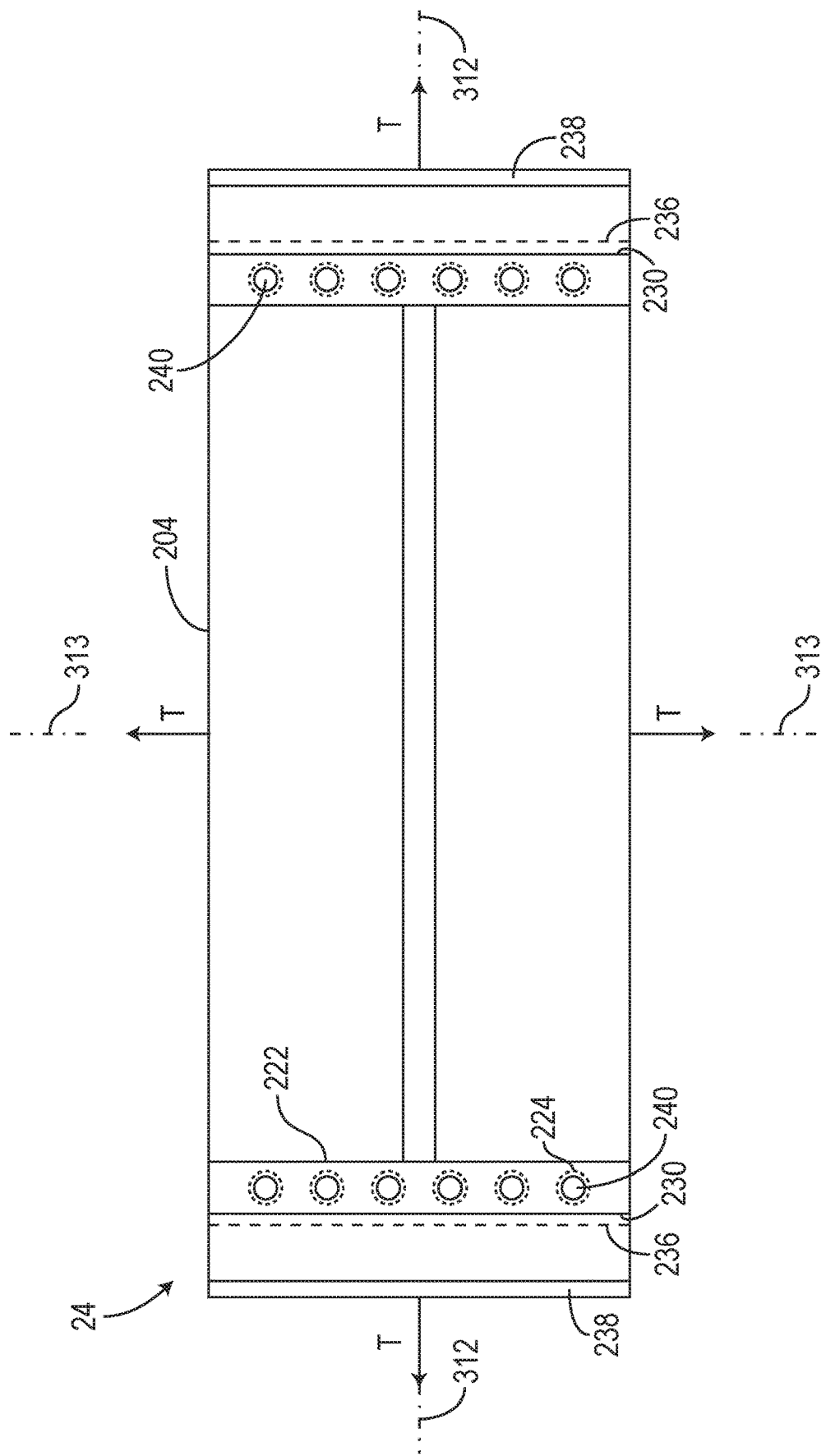
FIG. 14 is a top view of a fabric fender that may be assembled off-vehicle, according to an exemplary embodiment.

Referring particularly to FIG. 14, the fender 24 may be manufactured/assembled with the fabric 204 off of the concrete mixer truck 10. For example, the fabric 204 can be stretched across a frame 222 and held in place by a manufacturing frame 238. The fabric 204 can be loaded into a tensile state (e.g., T) in either the longitudinal direction (e.g., along the longitudinal axis 312) or in the lateral direction (e.g., along the lateral axis 313) or both, and retained in the tensile state by the manufacturing frame 238. The fabric 204 may then be fastened, riveted, fixedly coupled, adhered, etc., to the frame 222 (e.g., through fasteners 240). After the fabric 204 is fixedly coupled to the frame 12, the fabric 204 can be cut along cut-lines 236. The cut-lines 236 can be substantially in line with an outer edge of the frame members. In other embodiments, the cut-lines 236 are longitudinally offset (e.g., along the longitudinal axis 312) such that end portions of the fabric 204 can be wrapped around the frame 222. The frame 222 can be or include the inner members 202, the outer members 206, the longitudinal members 218, the lateral members 220, etc.

The fabric 204 can be configured to fixedly couple with the frame 222 through the grommets 224. The grommets 224 can be integrally formed with the fabric 204 and provide additional structural strength for retaining the fabric 204 in the tensile state. After the fabric 204 is fixedly coupled with the frame 222 and cut along the cut-lines 236, the fender 24 can be installed on the concrete mixer truck 10. For example, the brackets 216 can be fixedly coupled with the frame 222 so that the fender 24 can be fixedly coupled to the frame 12 of the concrete mixer truck 10. The entire fender 24 may be assembled off of the concrete mixer truck 10 and installed onto the concrete mixer truck 10. The entire fender 24 can then be removed from the concrete mixer truck 10 and replaced. The fender 24 can be removed and serviced off of the concrete mixer truck 10.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A fender for a vehicle, the fender comprising:
   a first set of an inner member and an outer member at a first position;
   a second set of the inner member and the outer member at a second position that is longitudinally offset from the first position; and
   a fabric disposed between the inner member and the outer member of the first set at a first end and the inner member and the outer member of the second set at a second end, wherein the fabric extends longitudinally between the first set and the second set;
   at least one tensioning mechanism, wherein the tensioning mechanism is positioned at at least one of the first and second ends of the fabric, the tensioning mechanism configured to adjustably increases a tensile load on the fabric between the first end and the second end, wherein the tensioning mechanism comprises:
   a body member;
   a track member configured to slidably engage a corresponding track portion of the body member such that the track member can translate longitudinally relative to the body member;
   an elongated member fixedly coupled with the track member such that translation of the track member drives the elongated member to translate, wherein the elongated member is configured to engage the fabric; and
   an adjustment member configured to drive the track member and the elongated member to translate longitudinally relative to the body member to adjust a tensile load on the fabric;
   wherein the fabric comprises a first set of grommets at the first end and a second set of grommets at the second end, wherein the first set of grommets and the second set of grommets are configured to receive a fastener therethrough to fixedly couple the first end and the second end of the fabric to the inner members and the outer members.

2. The fender of claim 1, wherein an inner surface of the fabric is configured to engage outer surfaces of the inner members, and an outer surface of the fabric is configured to engage inner surfaces of the outer members.

3. The fender of claim 1, further comprising a first fastener and a second fastener, wherein the first fastener extends through the inner member and the outer member of the first set and the second fastener extends through the inner member and the outer member of the second set to secure the fabric with the first set at the first end and the second set at the second end.

4. The fender of claim 1, further comprising a longitudinal support member, wherein the longitudinal support member extends longitudinally between the first set of the inner and outer members and the second set of the inner and outer members.

5. The fender of claim 1, further comprising one or more lateral support members spaced longitudinally apart along the fabric, wherein the lateral support member extends laterally across substantially an entire lateral width of the fabric.

6. The fender of claim 1, wherein the inner member of the first and second set is fixedly coupled with a bracket that is fixedly coupled with a frame of the vehicle.

7. The fender of claim 1, wherein the fabric is loaded in tension in at least one of a longitudinal direction or a lateral direction.

8. The fender of claim 1, wherein the fabric is a polyester material coated with a polyvinyl chloride.

9. A commercial vehicle comprising:
   a plurality of tractive elements;
   a primary mover configured to drive the plurality of tractive elements;
   a fender for the tractive elements, the fender comprising:
   a fabric;
   a first inner member and a first outer member positioned at a first end of the fabric, the first inner member and the first outer member extending laterally and configured to receive the first end of the fabric between the first inner member and the first outer member; and
   a second inner member and a second outer member positioned at a second end of the fabric that is opposite the first end, the second inner member and the second outer member longitudinally offset from the first inner member and the first outer member, the second inner member and the second outer member extending laterally and configured to receive the second end of the fabric between the second inner member and the second outer member;
   wherein the fabric extends longitudinally between (a) the first inner member and the first outer member that are positioned at the first end of the fabric and (b) the second inner member and the second outer member that are positioned at the second end of the fabric; and
   wherein the fabric is loaded in tension both longitudinally and laterally by a plurality of tensioning mechanisms.

10. The commercial vehicle of claim 9, wherein the fabric extends over one or more of the tractive elements to protect the one or more tractive elements.

11. The commercial vehicle of claim 9, further comprising one or more lateral support members spaced longitudinally apart along the fabric, wherein the lateral support member extends laterally across substantially an entire lateral width of the fabric.

12. The commercial vehicle of claim 9, wherein the first inner member and the second inner member are fixedly coupled with a frame of the commercial vehicle.

13. The commercial vehicle of claim 9, wherein the fabric is fastened at the first end with the first inner member and the first outer member and fastened at the second end with the second inner member and the second outer member.

14. The commercial vehicle of claim 9, wherein the commercial vehicle is a concrete mixer truck.

15. The commercial vehicle of claim 9, wherein the fabric comprises a first set of grommets at the first end and a second set of grommets at the second end, wherein the grommets are configured to receive a fastener therethrough to fixedly couple the first end and the second end of the fabric to the inner members and the outer members.

16. A chassis assembly for a commercial vehicle comprising:
- a frame extending in a longitudinal direction;
- a plurality of tractive elements coupled with the frame;
- a fender comprising:
  - a fabric;
  - a first inner member and a first outer member positioned at a first end of the fabric; and
  - a second inner member and a second outer member positioned at a second end of the fabric that is opposite the first end, the first inner member and the first outer member spaced from the second inner member and the second outer member in the longitudinal direction;
  - wherein the fabric extends longitudinally between (a) the first inner member and the first outer member that are positioned at the first end of the fabric and (b) the second inner member and the second outer member that are positioned at the second end of the fabric, the fabric being loaded in tension by a plurality of tensioning mechanisms;
  - wherein the fabric comprises a first set of grommets at the first end and a second set of grommets at the second end, wherein the grommets are configured to receive a fastener therethrough to fixedly couple the first end and the second end of the fabric to (a) the first inner member and the first outer member and (b) the second inner member and the second outer member.

17. The chassis assembly of claim 16, wherein the fender extends in the longitudinal direction along a side of the frame.

18. The chassis assembly of claim 16, wherein the fabric is loaded in tension longitudinally between (a) the first inner member and the first outer member and (b) the second inner member and the second outer member.

19. The chassis assembly of claim 18, wherein the fabric is loaded in tension in a lateral direction.

20. The chassis assembly of claim 16, wherein the first inner member, the first outer member, the second inner member, and the second outer member each have a pair of straight portions that extend vertically and are laterally offset from each other, and an arcuate medial portion that extends laterally between the pair of straight portions.

* * * * *